United States Patent
Kim

[11] Patent Number: 5,540,114
[45] Date of Patent: Jul. 30, 1996

[54] GEAR SHIFTING APPARATUS FOR USE IN A PNEUMATIC TRANSMISSION

[75] Inventor: Yu-Kyeom Kim, Ulsan, Rep. of Korea

[73] Assignee: Hyundai Motor Company, Seoul, Rep. of Korea

[21] Appl. No.: 330,529

[22] Filed: Oct. 28, 1994

[30] Foreign Application Priority Data

Oct. 29, 1993 [KR] Rep. of Korea ................ 93-22776

[51] Int. Cl.⁶ ............................................. G05G 9/10
[52] U.S. Cl. ............................................. 74/475
[58] Field of Search ................... 74/475, 335, 473 R; 192/84 P; 73/118.1

[56] References Cited

U.S. PATENT DOCUMENTS

| | | | |
|---|---|---|---|
| 4,438,657 | 3/1984 | Nobis | 74/473 R X |
| 4,507,736 | 3/1985 | Klatt | 74/475 X |
| 4,519,266 | 5/1985 | Reinecke | 74/473 R X |
| 4,631,679 | 12/1986 | Klatt | 74/475 X |
| 4,646,582 | 3/1987 | Kijima | 74/473 RO |
| 4,912,997 | 4/1990 | Malcolm et al. | 74/475 X |
| 5,351,570 | 10/1994 | Mizunuma et al. | 74/335 O |
| 5,370,015 | 12/1994 | Moscatelli | 74/335 O |

FOREIGN PATENT DOCUMENTS

| | | | |
|---|---|---|---|
| 2138568 | 5/1990 | Japan | 74/475 |
| 92-2336 | 3/1992 | Rep. of Korea . | |

*Primary Examiner*—Charles A. Marmor
*Assistant Examiner*—David Fenstermacher
*Attorney, Agent, or Firm*—Finnegan, Henderson, Farabow, Garrett & Dunner

[57] ABSTRACT

A pneumatic transmission for a motor vehicle is provided with a gear shifting apparatus employing a pair of photo-sensor arrangements, each of which is rotatably engaged with a shift shaft and a select shaft for detecting a position of a shift lever, and a cam arrangement coupled to the shift shaft for completing a shifting operation of the shift lever in case of a half shifting and providing a shifting feeling to a driver.

4 Claims, 5 Drawing Sheets

GEAR SHIFTING APPARATUS FOR USE IN A PNEUMATIC TRANSMISSION

FIELD OF THE INVENTION

The present invention relates to a gear shifting apparatus for use in a pneumatic transmission; and, more particularly, to a gear shifting apparatus capable of improving the reliability of a shifting operation of the pneumatic transmission.

DESCRIPTION OF THE PRIOR ART

Generally, in the so-called rear-engine rear-wheel drive type of an automotive vehicle such as a bus, a gear train transmission mechanism is mounted to a rear of the vehicle and operated remotely by the manipulation of, e.g., a manual lever. In such a case, various transmission types, e.g., a mechanical, a pneumatic and a hydraulic transmissions, may be employed to provide several forward drive ratios and one reverse drive ratio in the vehicle. The mechanical transmission includes numerous complex elements, e.g., intermediate rods and links, for transmitting or effectuating the manipulation of the manual lever to the gear shift mechanism, which tends to make it rather difficult to reliably produce the speed change operation thereof especially due to the frictional defacement between the intermediate transmitting elements in a long term use. On the other hand, the hydraulic transmission can provide a high reliability of the speed change but tends to entail a substantially higher level power and fuel consumption. Further, the production cost of the device is relatively high.

In contrast, the pneumatic transmission includes a remote control arrangement capable of reliably transmitting the driver's instruction through the manipulation of the manual lever to the gear train mechanism without having to employ the complex mechanical linkage. Therefore, there exist various advantages in the pneumatic transmission: the simplified construction, relatively low manufacturing cost, and accurate drive ratios. For these reasons, recent trend has been to equip the rear-engine rear-wheel drive vehicle with the pneumatic type of the transmission capable of providing a better performance and drivability. For example, Korean Patent Publication No. 92-2336 discloses a gear shifting apparatus for a pneumatic transmission which comprises an upper plate having a guide slot; a shifting lever inserted through the slot and pivotally mounted on a select shaft having a switch pusher; a first pair of contact switches for detecting a select position of the shifting lever depending upon a rotating direction of the select shaft; and a second pair of contact switches for detecting a shift position of the shifting lever depending upon the pivotal movement of the shifting lever.

However, the prior art gear shifting apparatus described above has the disadvantages of a lower degree of reliability; that employment of the contact switch decreases the operation efficiency of a detecting arrangement; and that there is no mechanism for providing a shifting feeling to the driver.

SUMMARY OF THE INVENTION

It is, therefore, an object of the present invention to provide a shifting apparatus for use in a pneumatic transmission capable of improving the reliability of a shifting operation of the pneumatic transmission.

It is another object of the present invention to provide a shifting apparatus for use in a pneumatic transmission capable of providing a shifting feeling to a user.

The above and other objects of the present invention are accomplished by means of a gear shifting apparatus for use in a pneumatic transmission for a motor vehicle, which comprises: a housing; an upper plate mounted on the housing and having a number of guide slots and a stopper downwardly extending from its inner surface; a shift lever inserted through the slot; a select rod to which the shift lever is resiliently coupled and having an elongated hole; a shift shaft rotatably attached to the housing through the elongated hole and provided with a first U-shaped member fixed thereto; a pair of select shafts rotatably attached to the housing in a cross relationship with the shift shaft and provided with a second U-shaped member in a cross relationship with the first U-shaped member; a pair of photo-sensor arrangements, each of which is rotatably engaged with the shift shaft and one of the select shafts for detecting a position of the shift lever; and a cam arrangement for completing a shifting operation of the shift lever in case of a half shifting and providing a shifting feeling to a driver.

In a preferred embodiment, the cam arrangement includes a cam fixed to the shift shaft and having a pair of protrusions, a roller in contact with the cam, a cylinder for providing an air pressure to a piston slidably inserted therein, a roller guide to which the roller is rotatably fixed and telescopically engaged with the cylinder, and a coil spring inserted between the piston and the roller guide.

In another preferred embodiment, the photo-sensor arrangement includes a sensor lever rotatably fixed to the shift shaft and having one end provided with a bifurcated branch and the other end integrated with a folded tip, a sensor rod attached to the U-shaped member to rotate therewith and slidably contacted with the bifurcated branch, and a number of photo-sensors for detecting whether the folded tip exists therein.

BRIEF DESCRIPTION OF THE DRAWINGS

The above and other objects, advantages and features of the present invention will be apparent from the following description of preferred embodiments taken in conjunction with the accompanying drawings, wherein.

DETAILED DESCRIPTION OF THE PREFERRED EMBODIMENTS

Figure 1:
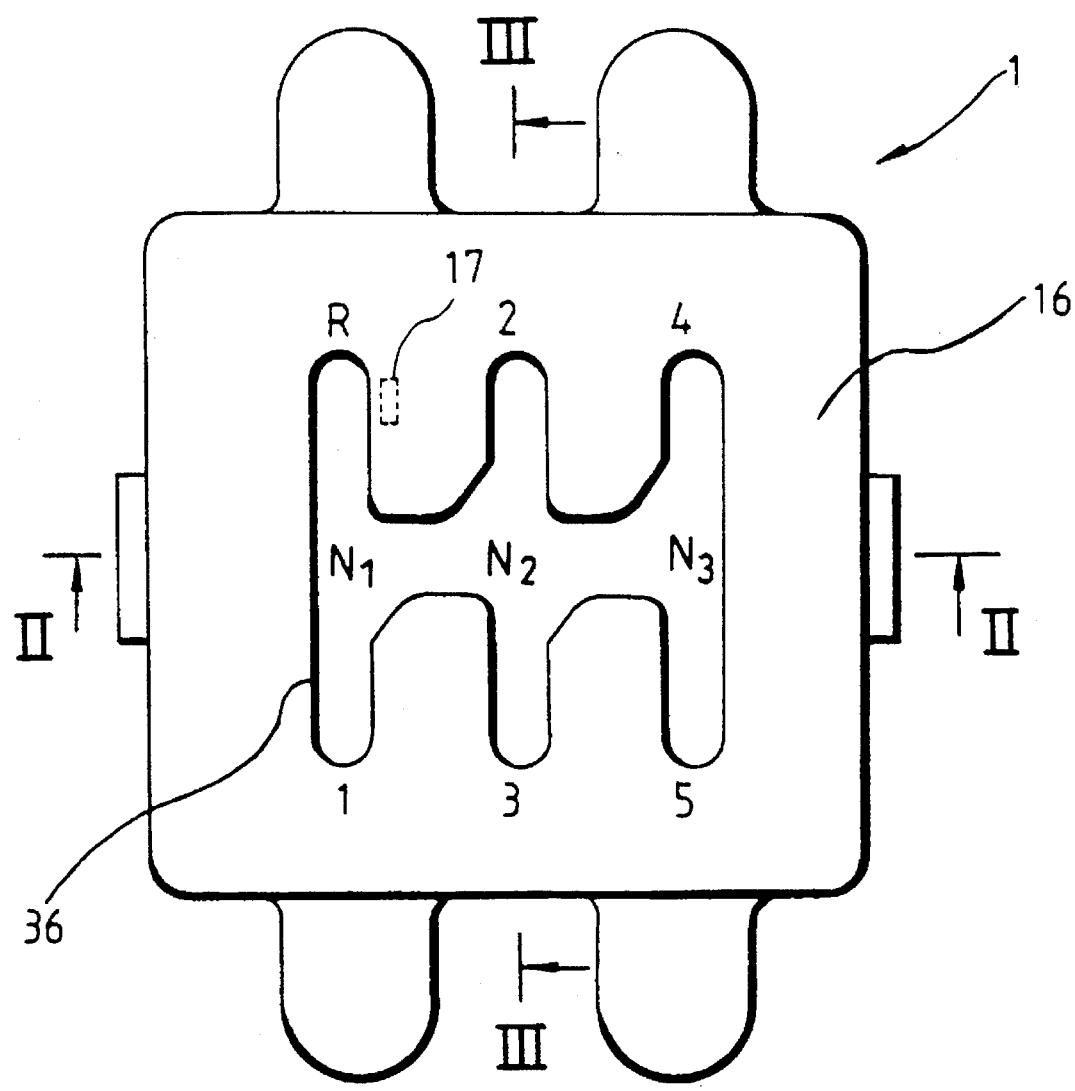
FIG. 1 presents a plan view of an upper plate of a shifting apparatus of a pneumatic transmission.

Referring first to FIG. 1, there is shown an upper plate 16 of a shifting apparatus of a pneumatic transmission 1. As shown, the upper plate 16 has a number of guide slots 36 for positioning the shift lever 13 (see FIG. 2) to change drive ratios of the transmission. The upper plate 16 has a stopper 17 downwardly extending from its inner surface to ensure that the shift lever 13 enters a reverse section R only when it is biased downward, as indicated by the direction of the arrow P.

Figure 2:
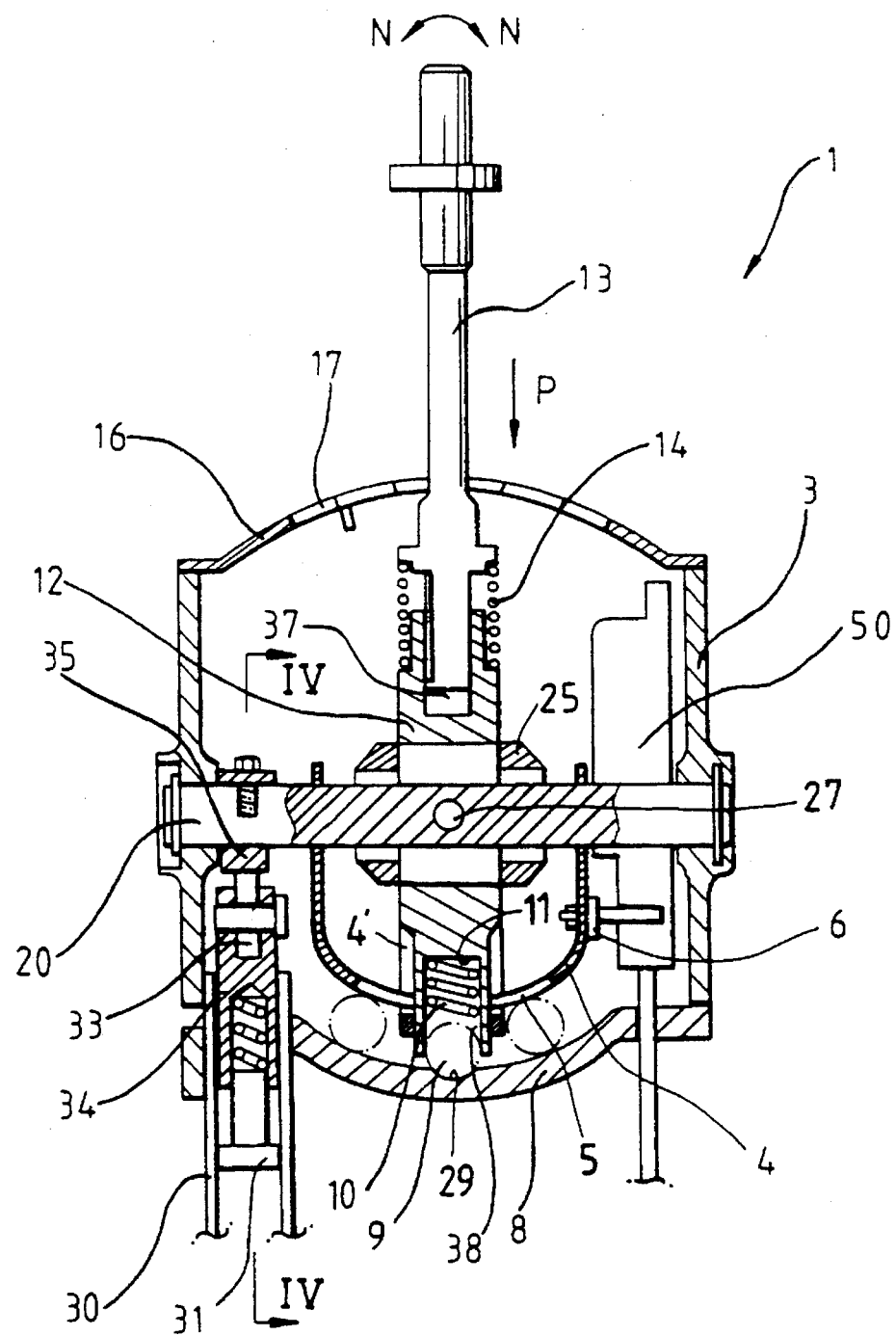
FIG. 2 provides a cross-sectional view taken along line II—II shown in FIG. 1.

FIG. 2 illustrates a cross-sectional view taken along line II—II shown in FIG. 1. As shown, the shift lever 13 is slidably coupled to a select rod 12 along its axial direction and a compression spring 14 is inserted between the shift lever 13 and the select rod 12 to upwardly urge the shift lever 13. The select rod 12 is pivotally coupled to a shift shaft 20 rotatably mounted to a housing 3. Located at one end of the shift shaft 20 is a first photo-sensor 50 for detecting the select positions N1, N2 and N3 of the shift lever 13; and fixed to the other end of the shift shaft 20 is a cam 35 for completing the shifting operation of the shift lever 13. A first U-shaped member 4, having a first slot 5 at its center, is fixed to the shift shaft 20, one end of which is located between the cam 35 and the select rod 12 and the other end of which is located between the select rod 12 and the first photo-sensor 50. The first U-shaped member 4 has a cross relationship with a second U-shaped member 4'(see FIG. 3) having a second slot 5' at its center. A lower end of the select rod 12 is inserted through the slots 5 and 5' and has a blind hole 11 in which a coil spring 10 and a ball 9 are seated. The ball 9 dwells in a groove 29 of a lower housing 8 when the shift lever 13 is in the neutral position N2; and moves to positions shown in dotted and dashed lines when the shift lever 13 is selected in the select positions N1 and N3. Attached to one side of the first U-shaped member 4 is a first sensor rod 6 for effectuating a rotation of the shift shaft 20 to the first photo-sensor 50

Figure 3:
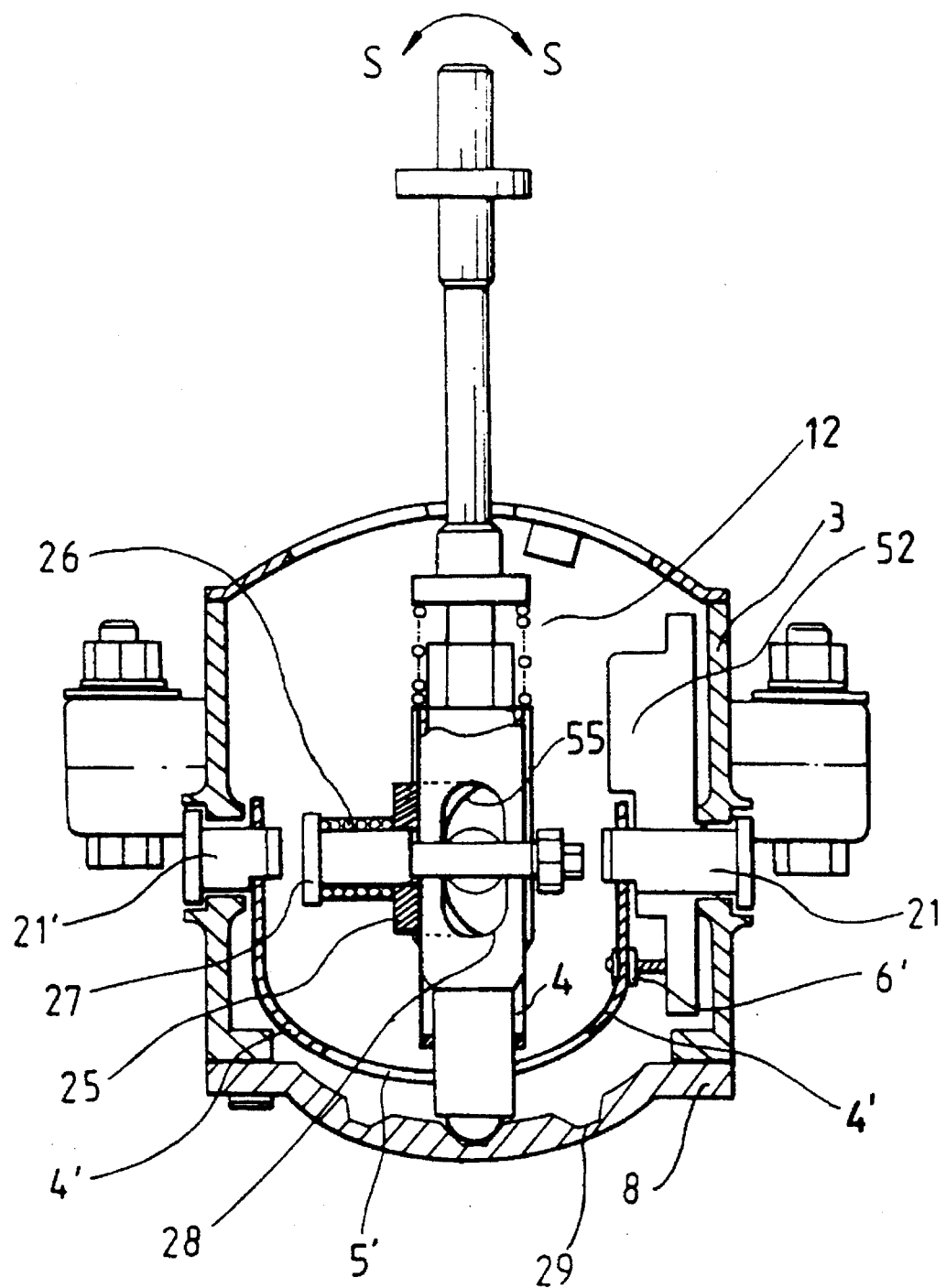
FIG. 3 represents a cross-sectional view taken along line III—III shown in FIG. 1.

FIG. 3 shows a cross-sectional view taken along line III—III shown in FIG. 1. As shown, the select rod 12 has an elongated hole 28 through which the shift shaft 20 is inserted, and a bolt 27 is inserted through the select rod 12 and the shift shaft 20 to rotate therewith. The bolt 27 has a small diameter section inserted into the select rod 12 and a large diameter section in which a coil spring 26 and a cam member 25 are resiliently inserted. The cam member 25 has a pair of arcuate wings 55 in contact with the shift shaft 20 to restore the select rod 12 to its original position N2 when the shift lever 13 is in the select positions N1 and N3. Each of the second U-shaped member 4' having a cross relationship with the first U-shaped member 4 is fixed to a pair of select shaft 21, 22' rotatably mounted to the housing 3. Attached to one side of the second U-shaped member 4' is a second sensor rod 6' for transmitting a rotation of the select shaft 21 to the second photo-sensor 52.

Figure 4A:
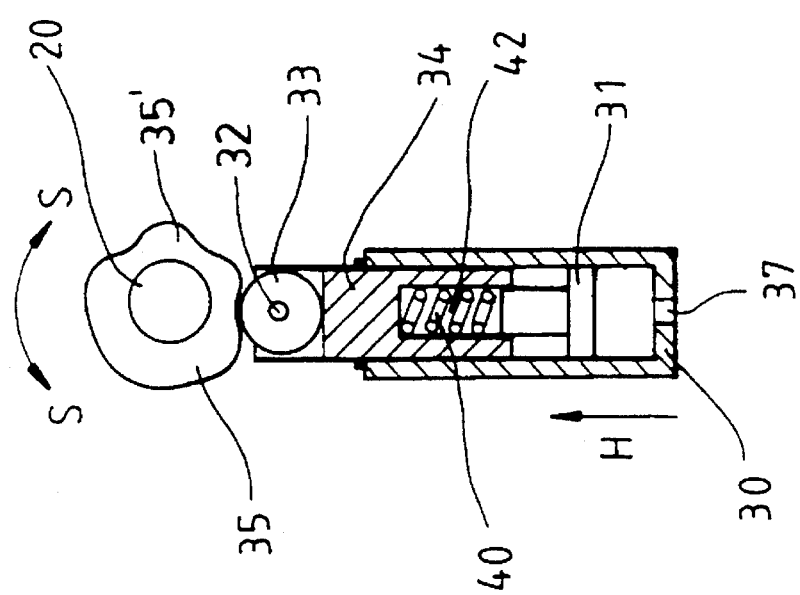
FIGS. 4A and 4B show an enlarged cross-sectional view taken along line IV—IV shown in FIG. 2.
Figure 4B:
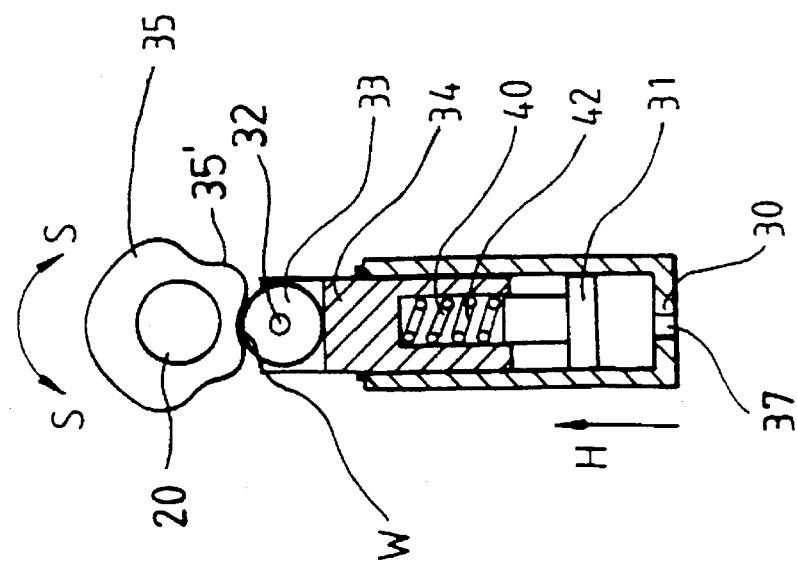

Referring to FIGS. 4A and 4B, there is shown an enlarged cross-sectional view taken along line IV—IV depicted in FIG. 2. As shown, the cam 35 rotatable with the shift shaft 20 has a caming surface in contact with a roller 33. The cam 35 has a pair of protrusions 35'. The roller 33 is rotatably fixed to a roller guide 34 about a Pin 32. The roller guide 34 is telescopically engaged with a cylinder 30 with a port 37 for supplying air pressure. The roller guide 34 has a second blind hole 42 through which a coil spring 40 and a piston 31 are inserted. When a driver pushes a clutch pedal, an air pressure from a pressurized air tank (not shown) is supplied into the cylinder 30 through the port 37 to upwardly urge the piston 31. Therefore, although the driver half shifts the shift lever 13, i.e., one of the protrusions 35' of the cam 35 contacts with the roller 33, the shift shaft 20 is forcedly rotated as shown in FIG. 4B, thereby providing a shifting feeling to the driver.

Figure 5B:
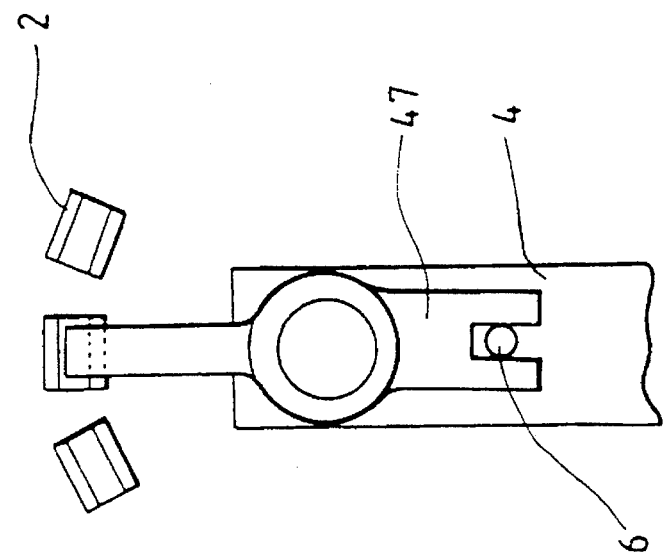
FIGS. 5A and 5B illustrate an enlarged view of the photo-sensor arrangement illustrated in FIG. 3.
Figure 5A:
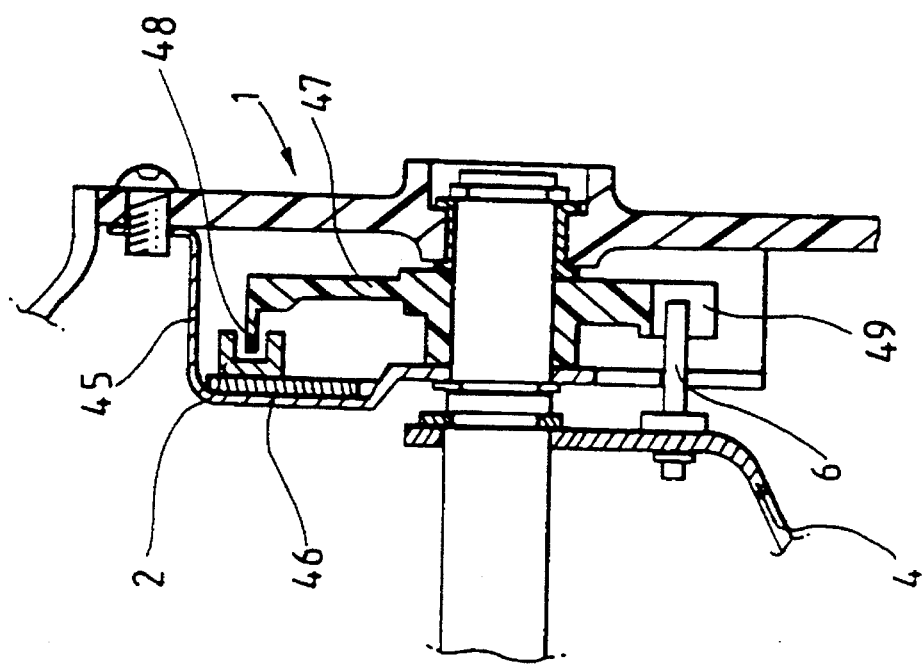

FIGS. 5A and 5B illustrates a photo-sensor arrangement in accordance with the present invention. As shown, a sensor lever 47 is rotatable about the shift shaft 20 and has opposite ends, one of which has a bifurcated branch 49 slidably contacting with the first sensor rod 6 and the other end of which has a folded tip 48 capable of passing through a number of photo-sensors 2 for transmitting the information whether the folded tip 48 exists therein to a control unit (not shown). Reference numerals 45 and 46 represent a sensor cover and a sensor mount, respectively.

Hereinafter, how the gear shifting apparatus operates, depending upon the movement of the shift lever, will be described with reference to the accompanying drawings.

First, when the shift lever 13 is selected in the direction of arrow N—N, i.e., the shift lever 13 moves from the neutral position N2 to the select positions N1 and N3, the select rod 12 (see FIG. 2) is pivoted together with the second U-shaped member 4'(see FIG. 3), with the first U-shaped member 4 halted. Thus, the second photo-sensor arrangement 52 coupled with the second sensor rod 6' detects the select positions N1, N2 and N3 to be transmitted to the control unit.

Then, when the shift lever 13 is shifted in the direction of arrow S—S, i.e., the shift lever 13 moves from the positions N1, N2 and N3 to the reverse and forward drive ratio sections R and 1 to 5, the select rod 12 (see FIG. 3) is pivoted together with the first U-shaped member 4 (see FIG. 2), with the second U-shaped member 4' halted. Thus, the first photo sensor arrangement 50 coupled with the first sensor rod 6 detects the shift positions R and 1 to 5 to be transmitted to the control unit.

On the other hand, when the driver stops the shift lever 13 at the select position N1 or N3, the select rod 12 is declined to push the wings 55 of the second cam 25 against the coil spring 26. Therefore, release of the shift lever 13 from the driver at the select position N1 or N3 makes the second cam 25 urge the select rod 12 to its original position, thus, the shift lever automatically returns to the neutral position N3.

Although the invention has been shown and described with respect to the exemplary embodiments, it should be understood by those skilled in the art that various changes, modifications and additions may be made without departing from the spirit and scope of the invention.

What is claimed is:

1. A gear shifting apparatus for use in a pneumatic transmission for a motor vehicle, which comprises:

a housing;

an upper plate mounted on the housing and having a number of guide slots and a stopper downwardly extending from its inner surface;

a shift lever slidably coupled at one end to a select rod and extending through one of the guide slots in the upper plate, the select rod being provided with an elongated hole;

a shift shaft rotatably attached to the housing through the elongated hole and provided with a first U-shaped member fixed thereto;

a pair of select shafts rotatably attached to the housing in crossed relationship with the shift shaft and provided with a second U-shaped member in crossed relationship with the first U-shaped member;

a pair of photo-sensor arrangements, each of which is rotatably engaged with the shift shaft and one of the select shafts for detecting a position of the shift lever, each of the pair of photo-sensor arrangements including a sensor lever rotatably fixed to the shift shaft and having one end provided with a bifurcated branch and the other end integrated with a folded tip, a sensor rod attached to the U-shaped member to rotate therewith and slidably contacting with the bifurcated branch, and a plurality of photo-sensors for detecting the presence of the folded tip therein; and a cam arrangement coupled to the shift lever in case of a half shifting actuation and for providing a shifting feeling to a driver.

2. The gear shifting apparatus as recited in claim 1, wherein said cam arrangement includes a cam fixed to the shift shaft and having a pair of protrusions, a roller in contact with the cam, a cylinder for providing an air pressure to a piston slidably inserted therein, a roller guide to which the roller is rotatably fixed and telescopically engaged with the cylinder, and a coil spring inserted between the piston and the roller guide.

3. The gear shifting apparatus as recited in claim 1, wherein said select rod has a lower end with a blind hole in which a coil spring and a ball are inserted, and the housing has a bottom plate with a number of grooves in which the ball is seated.

4. The gear shifting apparatus as recited in claim 1, wherein said select rod has a bolt, a cam member having a pair of arcuate wings contacting with the shift shaft, and a coil spring inserted between the bolt and the cam member to urge the cam member against the select rod.

* * * * *